Jan. 14, 1936.　　　F. E. WOLCOTT　　　2,028,033
COFFEE MAKER
Filed July 13, 1934

INVENTOR
FRANK E. WOLCOTT
BY
ATTORNEY.

Patented Jan. ., 1936

2,028,033

UNITED STATES PATENT OFFICE 2,028,033

COFFEE MAKER

Frank E. Wolcott, West Hartford, Conn., assignor to The Silex Company, a corporation of Connecticut Application July 13, 1934, Serial No. 735,032

30 Claims. (Cl. 219—43)

My invention relates to coffee makers.

It has for its object to provide an improved coffee maker, and more particularly an improved coffee maker of the electric type. A further object of my invention is to provide an improved stove for such a coffee maker especially adapted to use in connection with coffee maker bowls of small size and having improved means for supporting such bowls thereon, while continuing to obtain the quick cooling effect desired in such electric coffee makers. A still further object of my invention is to provide an improved stove of the general type described and claimed in my copending application, Serial No. 626,003, now Patent No. 1,983,212 and having improved bowl supporting means and improved air circulating means and base means, especially adapted to use in connection with coffee makers of small capacity. These and other objects and advantages of my improved construction will, however, hereinafter more fully appear.

In the accompanying drawing, I have shown for purposes of illustration one embodiment which my invention may assume in practice.

In the drawing,—

Figure 1:
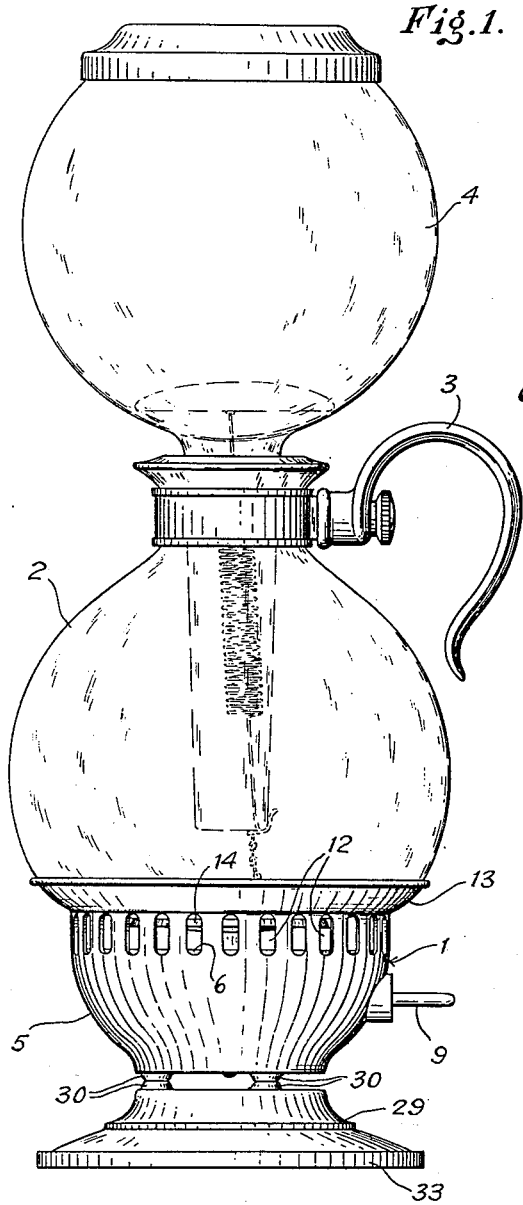
Figure 1 is a side elevation of a coffee maker constructed in accordance with my improvement.

In this illustrative construction, I have shown a coffee maker of the general type described and claimed in my copending application mentioned above, and including a stove, generally indicated at 1, a coffee maker lower bowl 2 having a handle 3 thereon, and an upper bowl 4 seated in the neck of the bowl 2 and provided with the usual straining and sealing means common to vacuum type coffee makers; the stove 1 being of an improved construction hereinafter more fully described.

Referring more particularly to the stove 1, it will be noted that the same comprises herein an upper bowl like member 5 having an open top and a refractory electric heating means or unit 6 spaced between the top and bottom thereof and herein, as preferably, of the general quick cooling construction described and claimed in my previous application mentioned and provided with similar air passages 7 and 8 around and through the same and suitable terminals 9 projecting through the side of the bowl member 5; this unit 6 herein also being generally similarly axially supported in spaced relation to the bottom 10 of the bowl 5 and a series of air passage means 11 being provided in this bottom 10 and communicating through the passage means 7 and 8 with air passage means 12 around the top of the bowl member 5 and beneath a rim 13 thereon, all as generally described in my previous application mentioned.

In this construction, however, it will be noted that the rim 13 is not the sole lower bowl support, as in my previous structure, the bowl 2 herein being supported on other means, and the rim, while it may also provide some support, particularly in certain sizes and shapes of bowls, largely constituting a cooperating confining means for the lower end of bowl 2 in properly and securely positioning the latter and the coffee maker on the stove. Further, it will be noted that I herein provide an improved axially located quick cooling bowl support engageable with the bottom of a bowl 2 in the rim 13, in such manner as to support the bowl and cooperate with the rim 13 in stably positioning the bowl while in no way disturbing the desired quick cooling character of the coffee maker.

While other forms of support may be used, if desired, it will be noted that this support is herein in the form of a disc 14 of suitable quick cooling material and preferably of metal and so disposed as to engage at its periphery the bottom of the bowl 2 and cooperate with the rim 13 in effectively positioning the coffee maker. As shown this disc 14 is also substantially spaced above the top of the unit 6 in such manner as to provide quick cooling air passage means around the disc support and between the disc and the top of the unit and communicating laterally with the atmosphere. Further, it will be noted that the same is provided with a relatively raised periphery 15 engageable as aforesaid with the bowl bottom and having a depending peripheral flange 16, while the portion of the disc within the periphery 15 is depressed in such manner as to be out of contact with the bowl bottom, and provide an air chamber 17 above the center of the disc and below the bowl bottom. As shown, a series of apertures 18 is also provided around the center of the disc just within the periphery 15 in such manner as to facilitate air circulation through the disc. It will also be noted that the disc is provided with a downturned or counterbored axially apertured portion 19 in which the head 20 of an axial holding screw 21 is disposed, preferably with its head flush with the inner surface of the disc 14. Moreover, a supporting member 22, herein in the form of a sleeve beveled out at its top to receive the portion 19, surrounds the latter and engages the under side of the disc in such manner as to provide an effective support therefor when the screw 21 is in position, while the lower end of the sleeve 22 is received in a correspondingly shaped axial aperture 23 in the refractory body of the quick cooling unit 6, and is spaced from the resistance of that unit by the walls of the aperture 23.

In this construction, improved baffle means 24 are also provided between the unit 6 and the bottom 10 of the member 5. These baffle means herein are, as preferably, in the form of a disc 24 disposed between the adjacent ends of suitable spacing sleeves 25 and 26, herein of metal and coaxial with an axial aperture 27 in the disc 24 and adapted to be held in position by the screw 21 when the same has its lower end threaded, as at 28, into a threaded axial aperture in the bottom 10 of the member 5. In a preferred construction, this disc 24 is also imperforate save for its axial aperture and also has its periphery spaced from the walls of the member 5 as illustrated. Thus, it will be evident that both baffling and air circulating means are provided, air flowing during heating and cooling of the unit 6, up through the apertures 11 and around the periphery of the disc 24 and up through and around the unit 6, while any tendency for heat to be distributed below that unit is effectually minimized.

Attention is also directed to the improved base means herein provided. As shown, these means include a hollow base member 29, preferably shallow as compared with the member 5 and suitably connected to the latter, as by means of a series of cooperating heat insulating members in the form of rivet connected knobs 30, struck up and down, respectively, from the periphery of the top 31 of the member 29 and the periphery of the bottom 10 of the member 5. Also, as illustrated, the top 31 is provided with a smaller depressed axial cup forming portion 32 open at the top, and with a suitable base plate 33, this plate being positioned on the member 29 by an axial screw 34 having its head disposed in an axial aperture 35 in the base plate and its threaded end threaded into a corresponding threaded aperture 32' in the depressed cup 32. As shown herein, the base plate 33 is, as preferably, formed of insulating material such, for example, as Bakelite or a like material and is also provided with a raised peripheral flange 36 receiving and positioning the lower edge of the member 29, and also with a raised axial portion 37 in the bottom of which the axial opening 35, mentioned above, is provided, while the top of the member 33 is substantially spaced at all points save at its flange 36, from the member 29.

Figure 2:
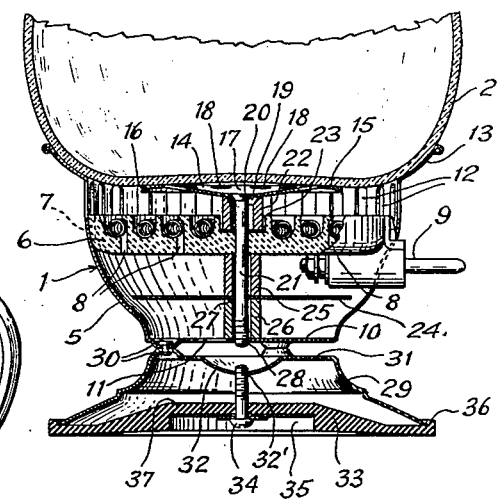
Figure 2 is a vertical sectional view through the stove and the lower part of a lower bowl thereon, the top of the bowl being broken away to facilitate illustration.
Figure 3:
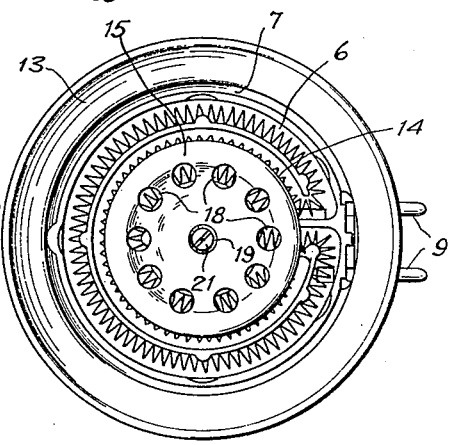
Figure 3 is a top plan view of the stove, the bowl being removed.
Figure 4:
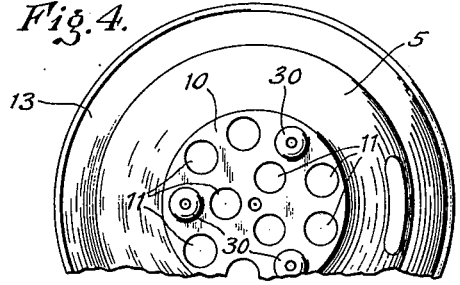
Figure 4 is a bottom plan view of the upper stove member.

In operation, it will be understood that when the bowl 2 of the coffee maker is in the rim 13 and on the axial support 14, and current is supplied to the unit 6, the heat from the latter will function in a usual manner to heat the water in the lower bowl 2, and cause this water to infuse the ground coffee in the upper bowl 4, while, when the heat is shut off and the bowl 2 is left in the position described, the brewed coffee will be returned from the bowl 4 to the bowl 2 within the limits of a normal infusion. Further, it will be understood that during heating and cooling of the stove, there will be an induced air flow up through the openings 10 and around the baffle 24 and through and around the unit 6 and laterally out through the apertures 12, while the bowl 2 remains in the position illustrated in Figure 2, all in the desired manner to effect quick heating of the bowl 2 and also automatic quick cooling of the latter as described when the current is cut off and without requiring manual removal of bowl 2 from the stove 1. Here it will be particularly noted that, due to the provision of the quick cooling support and its spacing from the upper face of the unit 6, not only is conduction to the lower bowl limited and radiation from the parts below the same increased, but cooling passage means are provided above the upper face of the unit 6. Herein also these passage means communicate with the apertures 12 and 18 and the air flow up through and around the unit 6.

As a result of my improved construction, it will be noted that a stove is produced which, while especially adapted to use with bowls of small diameter and the relatively abruptly curving bottom peripheries thereof, is also adapted to provide an exceedingly stable support for such bowls, the latter being supported both in the rim 13 and on the periphery 15 of the member 14. Further, it will be noted that although the support 14 is disposed above the heating unit 6, the structure is such as not only to withstand the heat but to make possible a minimum of heat absorption and storage above the unit in the supplementary support, so that the stove, as a whole, continues to have the desired quick cooling effect irrespective of the provision of this support. Moreover, it will be noted that the bottom of the member 5 and the base 29, 33 is effectively insulated by the baffle means and that the latter is so disposed relative to the bottom 10 as to contribute effectively to quick cooling, the same cooperating in insuring an effective circulation of air up through the bottom of the member 5 and around the baffle as aforesaid. As a result of the improved base construction, it will also be noted that a base 29 is provided which is cool at all times and which further eliminates the necessity for separately attached feet while also making it possible to produce an exceedingly simple and attractive structure. These and other advantages of my improvements will, however, be clearly apparent to those skilled in the art.

While I have in this application specifically described one illustrative embodiment of my invention, it will be understood that the same is used for illustrative purposes, and that my invention may be modified and embodied in various other forms without departing from its spirit or the scope of the appended claims.

What I claim as new and desire to secure by Letters Patent is:

1. In combination, a vacuum type coffee maker comprising interconnected upper and lower bowls, electric heating means for the lower bowl, and a lower bowl supporting means axially located on said heating means and supporting said lower bowl above the latter.

2. In combination, a vacuum type coffee maker comprising interconnected upper and lower bowls, electric heating means for the lower bowl, and a lower bowl supporting means carried on said heating means and projecting upward therefrom to space the lower bowl bottom therefrom.

3. In combination, a vacuum type coffee maker comprising interconnected upper and lower bowls, electric heating means for the lower bowl, and a lower bowl supporting means carried on said heating means and projecting upward therefrom to space the lower bowl bottom therefrom and having quick cooling passage means between said heating means and said bowl bottom.

4. In combination, a vacuum type coffee maker comprising interconnected upper and lower bowls, electric heating means for the lower bowl, a lower bowl supporting means axially located on said heating means and supporting said lower bowl above the latter, and bowl confining rim means for said lower bowl cooperating with said supporting means.

5. In combination, a vacuum type coffee maker comprising interconnected upper and lower bowls, electric heating means for the lower bowl, and a lower bowl supporting means axially located on said heating means and supporting said lower bowl above the latter, said heating means and supporting means having means for effecting sufficient cooling of said lower bowl to effect the return of brewed coffee from the upper bowl within a normal infusion period after cessation of current flow.

6. In combination, a vacuum type coffee maker comprising interconnected upper and lower bowls, electric heating means for the lower bowl, and a lower bowl supporting means axially located on said heating means and supporting said lower bowl above the latter, said heating means, supporting means, and confining means having means for effecting cooling of said lower bowl to effect the return of brewed coffee from the upper bowl within a normal infusion period after cessation of current flow.

7. In an electric stove, electric heating means, and bowl supporting means carried on said heating means and projecting above said heating means and spacing the bottom of a bowl therefrom.

8. In an electric stove, a refractory resistance carrying disc, and bowl supporting means carried thereby and projecting above said disc and spacing the bottom of a bowl therefrom.

9. In an electric stove, a refractory resistance carrying disc, and bowl supporting means carried thereby and projecting above said disc and spacing the bottom of a bowl therefrom and comprising a quick cooling structure providing air passage means between said disc and a bowl on said supporting means.

10. In an electric stove, electric heating means, and bowl supporting means axially supported thereon and disposed above said heating means and spacing the bottom of a bowl therefrom.

11. In an electric stove, electric heating means, and bowl supporting means axially supported thereon and disposed above said heating means including a quick cooling bowl supporting structure between said heating means and the bottom of a bowl heated thereby.

12. In an electric stove, electric heating means and bowl supporting means axially supported thereon and disposed above said heating means including a quick cooling bowl supporting structure having peripheral bowl supporting means and air cooling means within the latter.

13. An electric stove having an electric heating unit, and an axially supported bowl support carried by said unit and spaced above the surface of the same.

14. An electric stove having an electric heating unit, an axially supported bowl support carried by said unit and spaced above the surface of the same, and a bowl receiving rim spaced above said heating unit and surrounding said support and providing free communication with the atmosphere beneath said rim.

15. In an electric coffee maker stove, electrically supported thereon and disposed within the heating means, and bowl supporting means axperipheral limits of said heating means above the latter, said electric heating means and bowl supporting means having means for effecting adequate cooling of the lower bowl of a coffee maker on said supporting means within a normal infusion period following cessation of current flow.

16. In an electric coffee maker stove, electric heating means, bowl supporting means axially supported thereon and disposed within the peripheral limits of said heating means above the latter, and cooperating bowl confining means surrounding said supporting means and having below the same laterally communicating air passage means leading from said heating means.

17. In an electric coffee maker stove, electric heating means, bowl supporting means axially supported thereon and disposed within the peripheral limits of said heating means above the latter, and cooperating bowl confining means surrounding said supporting means and having below the same laterally communicating air passage means leading from said heating means, said electric heating means and bowl supporting means having means for effecting adequate cooling of the lower bowl of a coffee maker on said supporting means within a normal infusion period following cessation of current flow.

18. In combination, an electric heating unit, an axially located bowl supporting means and spaced above the latter and spacing a bowl bottom therefrom, and an axial support for said supporting means.

19. In combination, an electric heating unit, an axially located bowl supporting means and spaced above the latter and spacing a bowl bottom therefrom, and an axial support for said supporting means comprising coaxial sleeve and connecting members carried by said heating unit.

20. In combination, an electric heating unit, an axially located bowl supporting means of smaller diameter than said unit and spaced above the latter, and an axial support for said supporting means, said supporting means comprising a disc having an axial supporting connection to said heating means, a peripheral bowl engaging portion, and a depressed apertured center portion having air passage means therethrough.

21. In an electric stove, a casing having an open top and lateral passage means establishing communication with the atmosphere below said top, a heating unit in said casing below said means, baffle means spaced between the bottoms of said heating unit and casing, and means for establishing air flow through said casing bottom.

22. In an electric stove, a casing having an open top and lateral passage means establishing communication with the atmosphere below said top, a heating unit in said casing below said means, baffle means spaced between the bottoms of said heating unit and casing, and means for establishing air flow through said casing bottom and through and around said heating means.

23. In an electric stove, an upstanding heater bowl having a heating unit therein and air passages leading up through said bowl, an inverted base bowl, a plate beneath the bottom of said inverted bowl, means between said parts connecting the same into a unit, and means providing air passage means between said bowls communicating with said air passage means in said upstanding bowl.

24. In an electric stove, an upstanding bowl having a heating unit therein, an inverted base member disposed beneath the bottom of said upstanding bowl, a base plate supporting the periphery of said inverted base member, and axially located means connecting said heating unit and base plate to form a unitary construction with said bowls.

25. In an electric stove, an upstanding bowl having a heating unit therein, an inverted base member disposed beneath the bottom of said upstanding bowl, a base plate supporting the periphery of said inverted base member, and axially located means connecting said heating unit and base plate to form a unitary construction with said bowls including coaxially disposed screws one operable from the top of said heating unit and the other from the bottom of said base plate.

26. In an electric stove, an upstanding bowl having a heating unit therein and a bowl support projecting above said heating unit and supported coaxially within said upstanding bowl, said bowl support spacing the bottom of a bowl from said heating unit.

27. In an electric stove, an upstanding bowl having a heating unit therein and a bowl support projecting above said heating unit and supported coaxially within said upstanding bowl, said bowl support spacing the bottom of a bowl from said heating unit, and baffle means between the bottom of said heating unit and the bottom of said upstanding bowl.

28. In an electric stove, an upstanding bowl having a heating unit therein and a bowl support projecting above said heating unit and supported coaxially within said upstanding bowl, said bowl support spacing the bottom of a bowl from said heating unit, and both said bowl supporting means and said upstanding bowl having air passage means therethrough for effecting quick cooling upon cessation of current flow.

29. In an electric stove, an upstanding heater bowl having a heating unit therein, an inverted base bowl, means connecting said bowls together, a base plate supporting the periphery of said inverted bowl, and axial means for attaching said base plate to the latter.

30. In an electric stove, an upstanding heater bowl having a heating unit therein, an inverted base bowl, means connecting said bowls together, a base plate supporting the periphery of said inverted bowl, and axial means for attaching said base plate to the latter, said inverted bowl having a depending bottom edge and said base plate having an upstanding flange confining said edge.

FRANK E. WOLCOTT.

CERTIFICATE OF CORRECTION.

Patent No. 2,028,033. January 14, 1936.

FRANK E. WOLCOTT.

It is hereby certified that error appears in the printed specification of the above numbered patent requiring correction as follows: Page 1, first column, line 15, after "No. 1,983,212" insert a comma; page 3, first column, line 59, claim 12, after "means" insert a comma; and second column, line 2, claim 15, " strike out the syllable and words "ially supported thereon and disposed within the" and insert the same after line 3, same claim; lines 32 and 37, claims 18 and 19 respectively, strike out the word "and"; and that the said Letters Patent should be read with these corrections therein that the same may conform to the record of the case in the Patent Office.

Signed and sealed this 25th day of February, A. D. 1936.

(Seal)

Leslie Frazer
Acting Commissioner of Patents.